Aug. 21, 1956      J. H. McLEOD      2,759,393
OPTICAL ALIGNERS EMPLOYING AXICONS
Filed Oct. 25, 1952      10 Sheets—Sheet 1
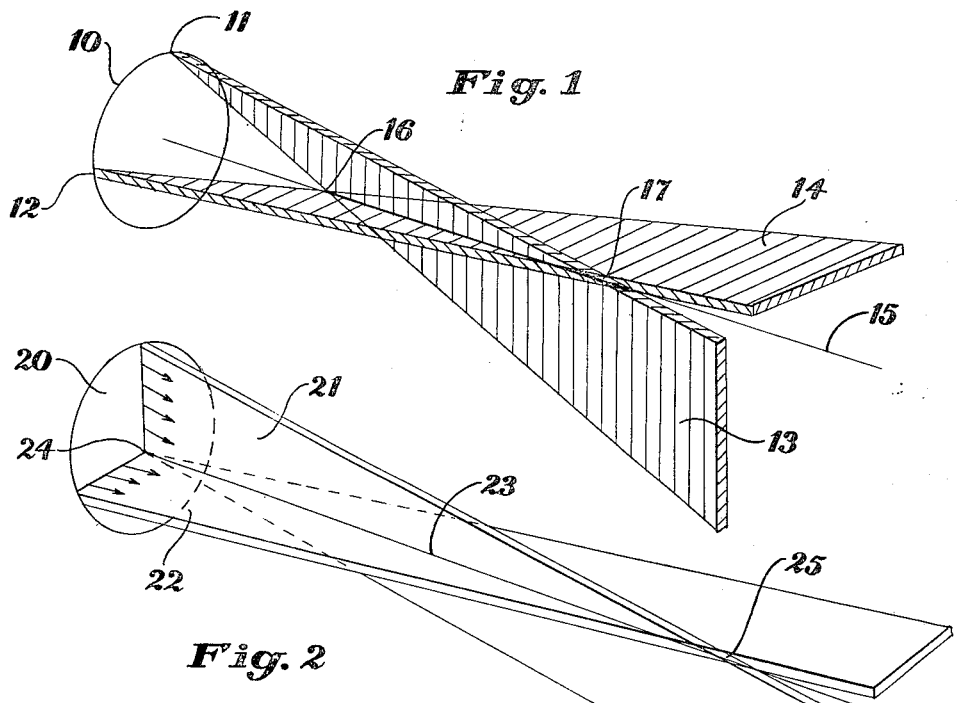
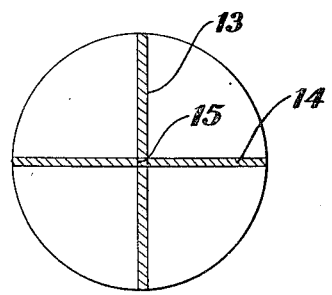
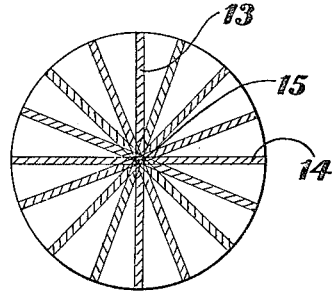
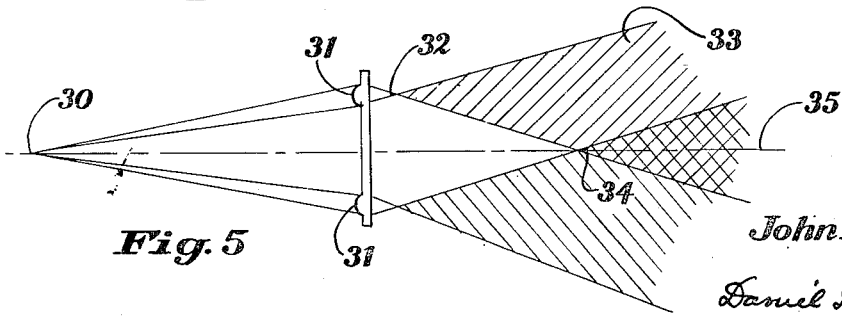
John H. McLeod
INVENTOR.
ATTORNEYS

 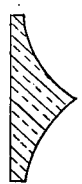    
Fig. 6   Fig. 7   Fig. 8   Fig. 9   Fig. 10   Fig. 11
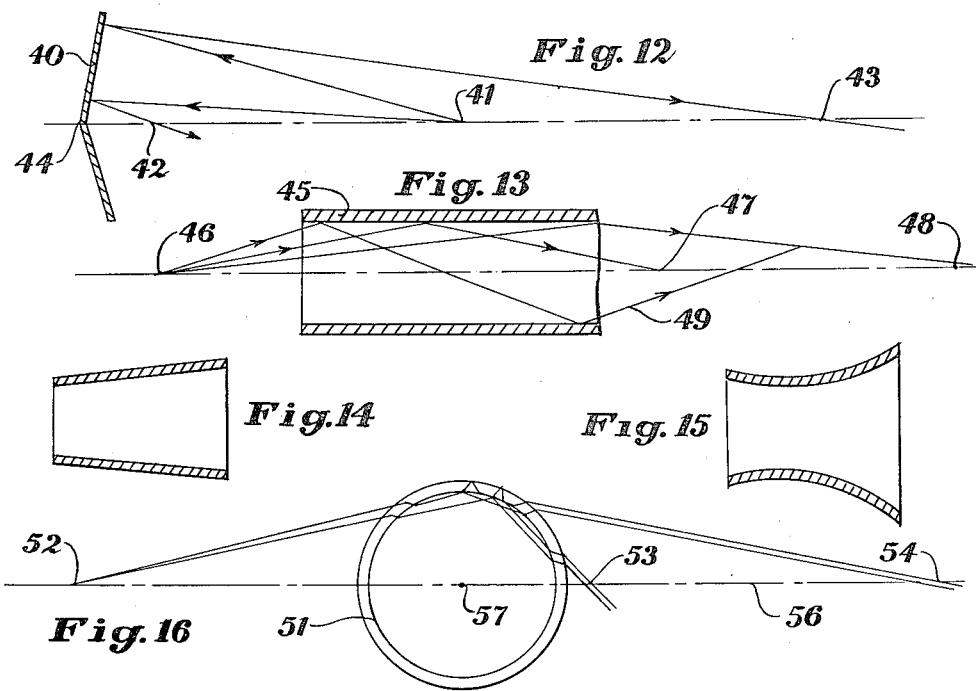
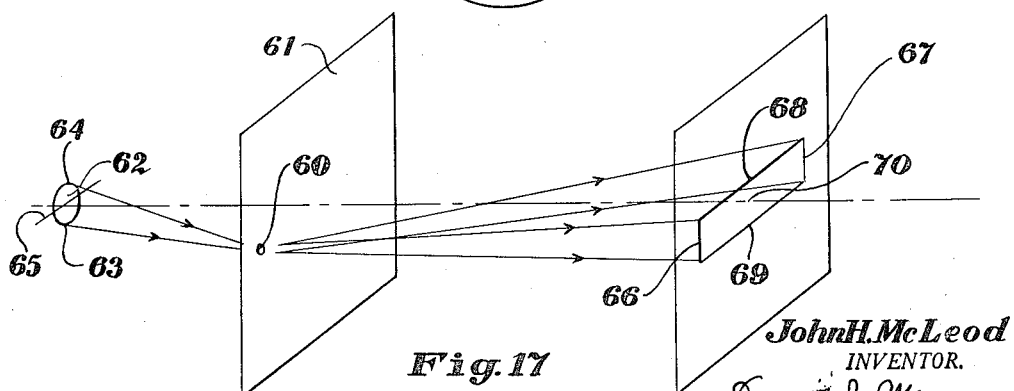

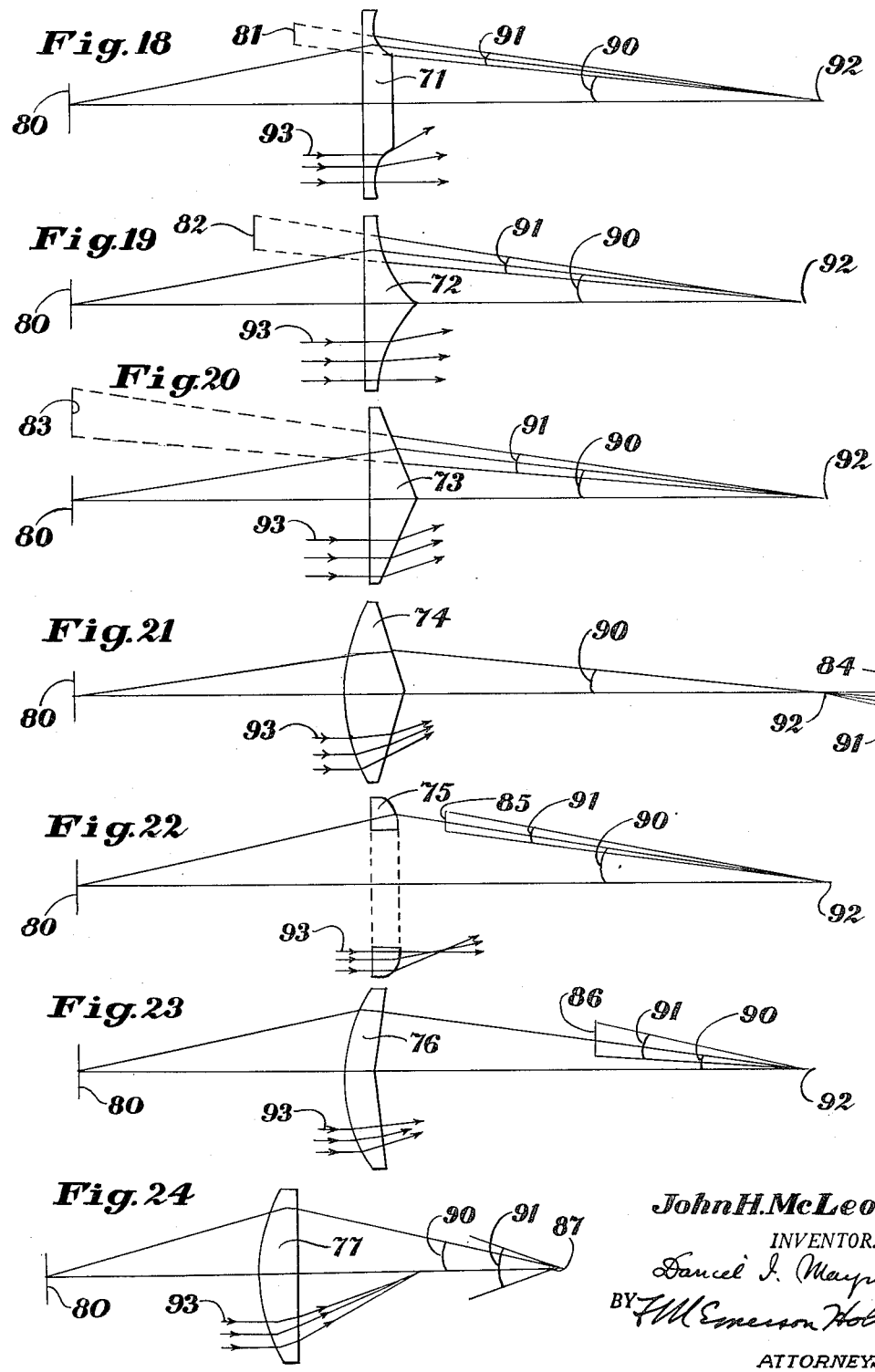

Aug. 21, 1956  J. H. McLEOD  2,759,393
OPTICAL ALIGNERS EMPLOYING AXICONS
Filed Oct. 25, 1952  10 Sheets-Sheet 4

John H. McLeod
INVENTOR.
Daniel I. Mayne
BY J. M. Emerson Holmes
ATTORNEYS

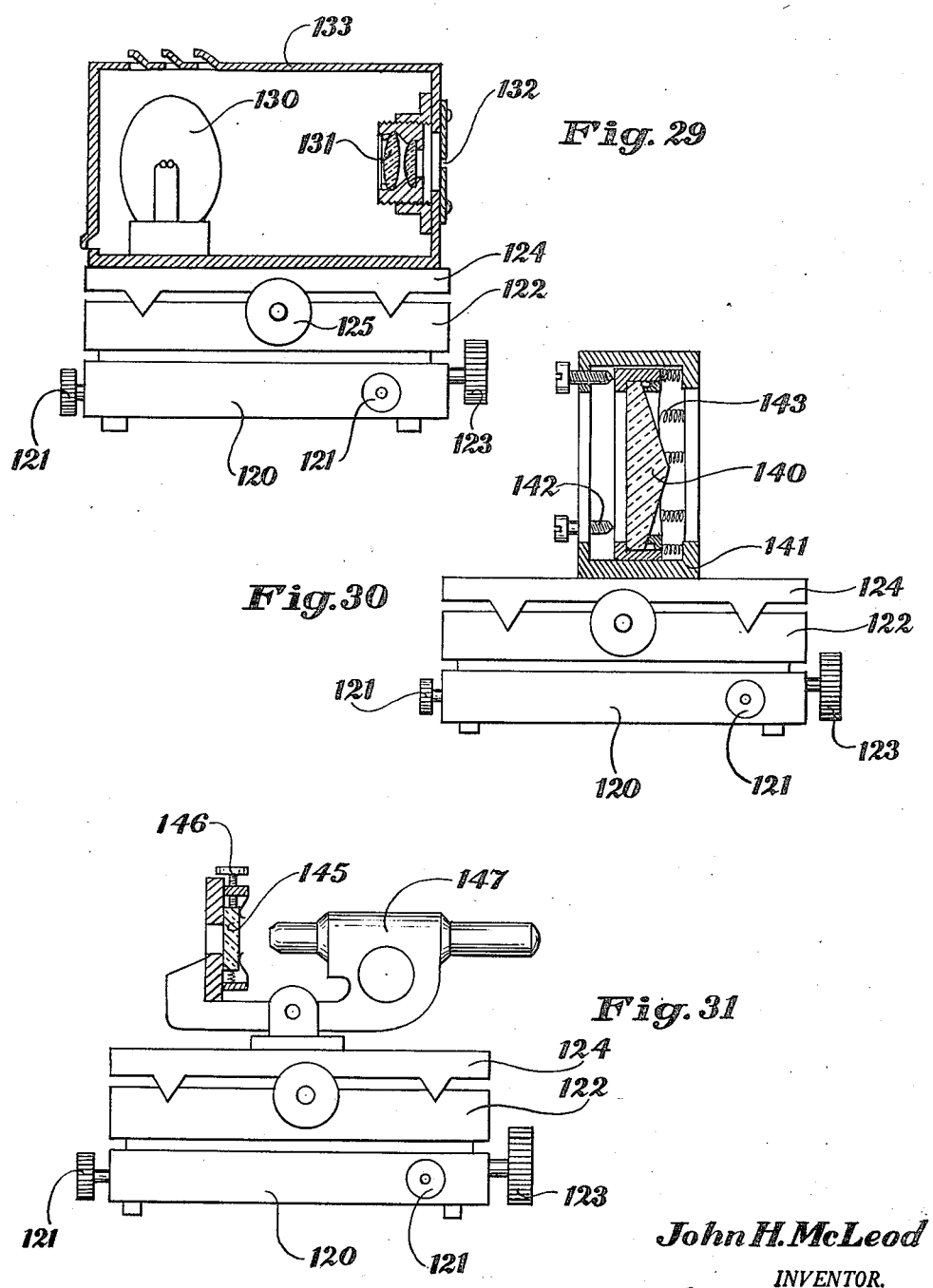

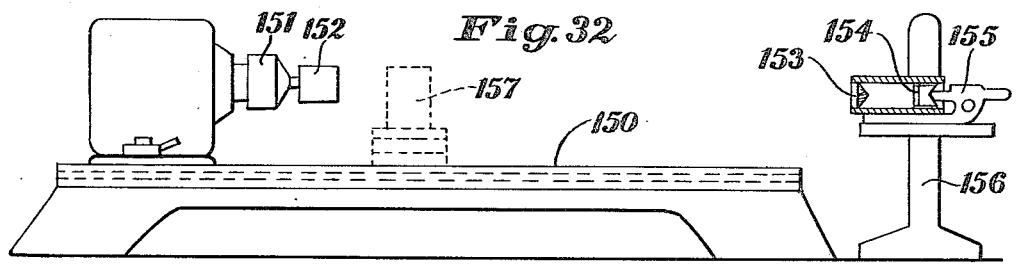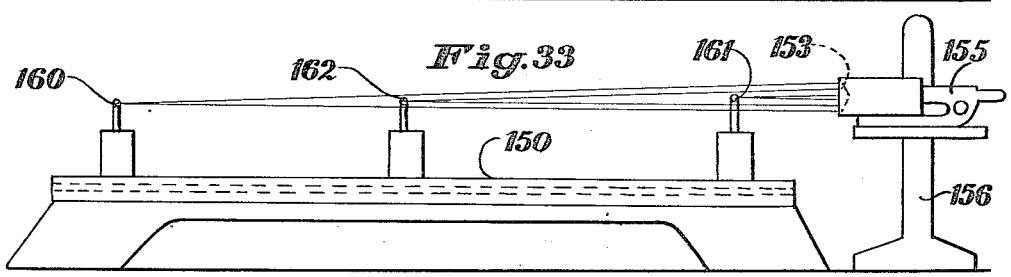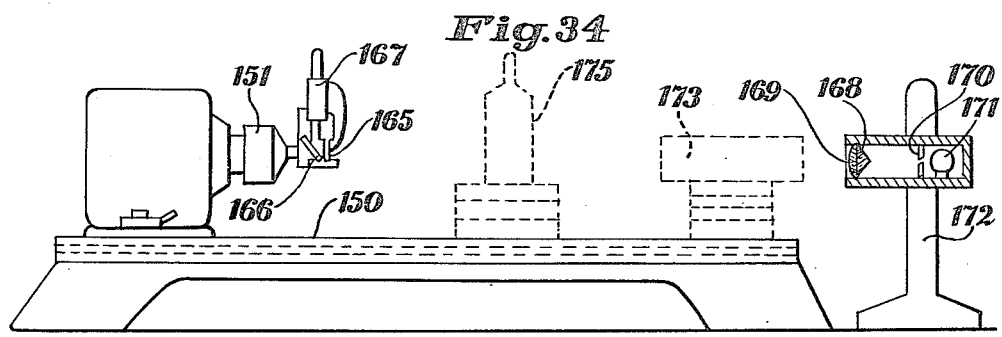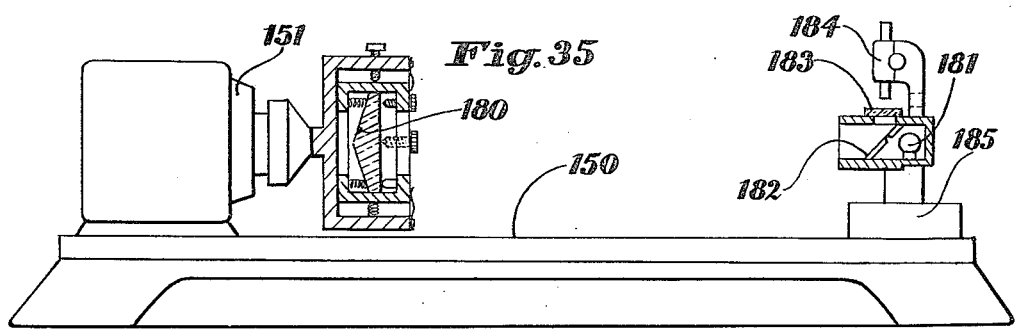

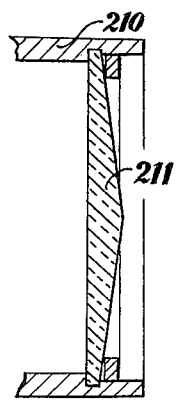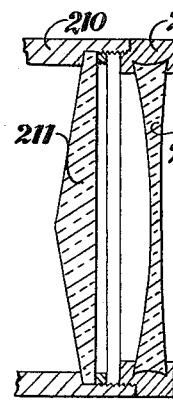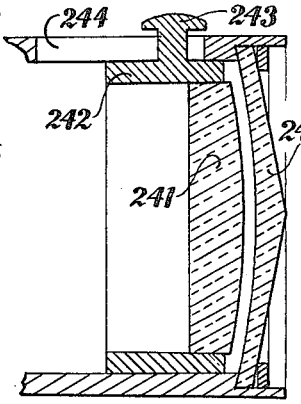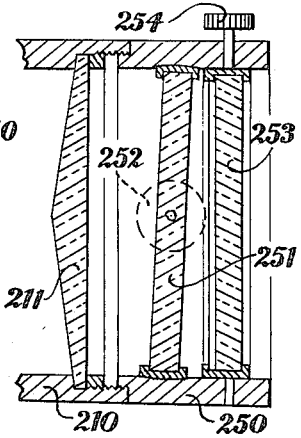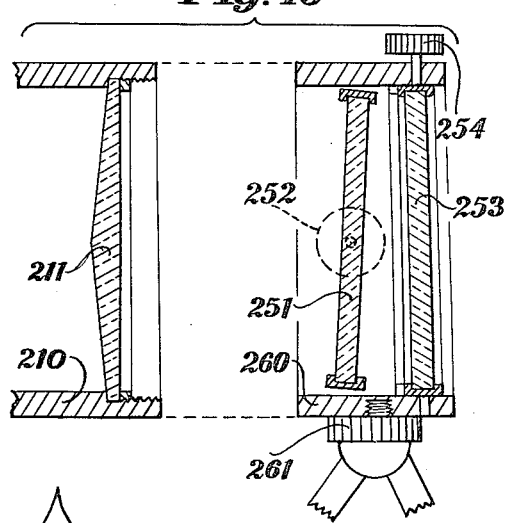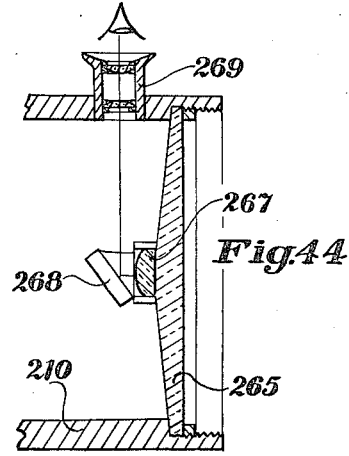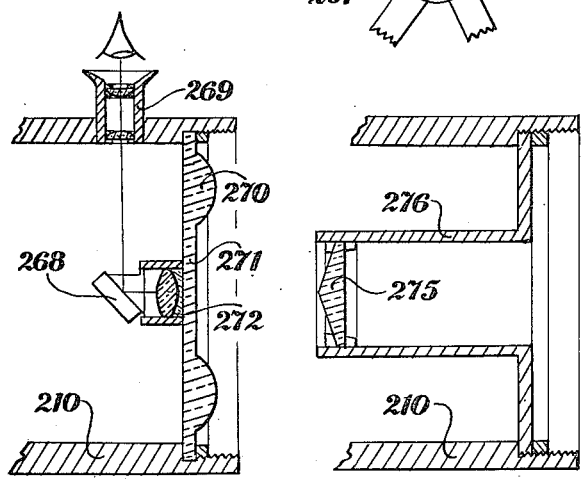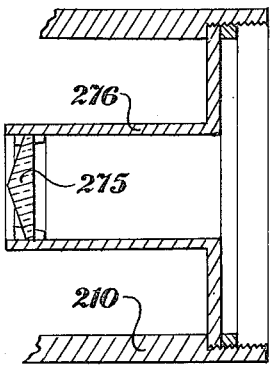

Aug. 21, 1956 J. H. McLEOD 2,759,393
OPTICAL ALIGNERS EMPLOYING AXICONS
Filed Oct. 25, 1952
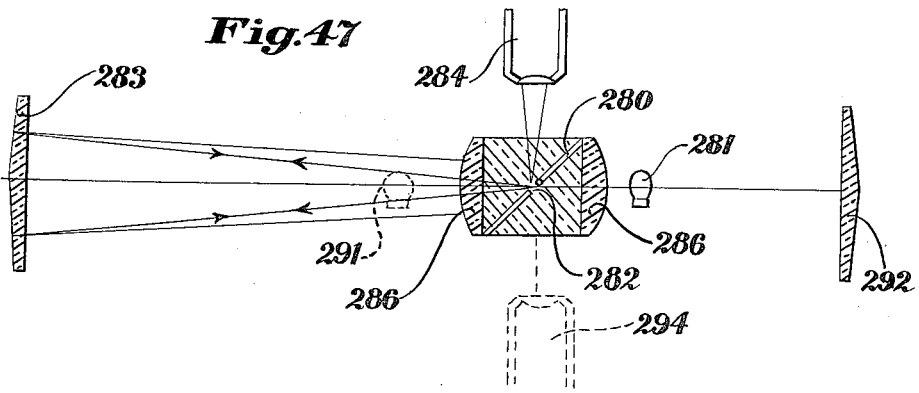
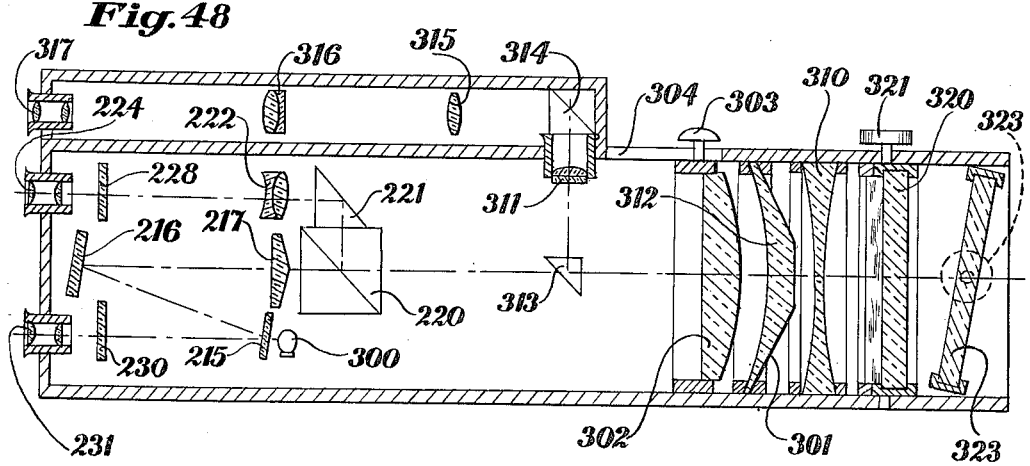
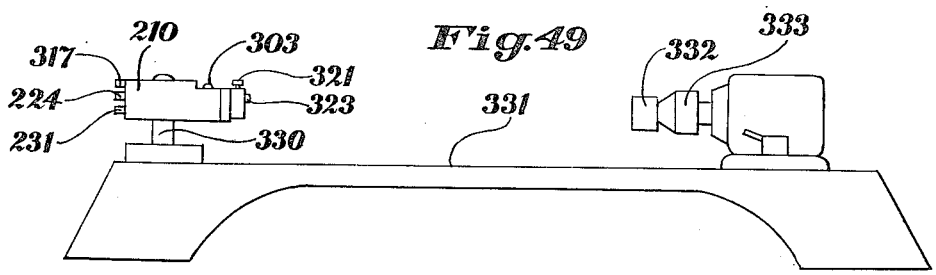
John H. McLeod
INVENTOR.
ATTORNEYS Aug. 21, 1956  J. H. McLEOD  2,759,393
OPTICAL ALIGNERS EMPLOYING AXICONS
Filed Oct. 25, 1952  10 Sheets-Sheet 10

John H. McLeod
INVENTOR.

BY *Daniel I. Wayne*
*M. Emerson Holm*
ATTORNEYS

United States Patent Office 2,759,393
Patented Aug. 21, 1956

2,759,393

OPTICAL ALIGNERS EMPLOYING AXICONS

John H. McLeod, Rochester, N. Y., assignor to Eastman Kodak Company, Rochester, N. Y., a corporation of New Jersey Application October 25, 1952, Serial No. 316,851

24 Claims. (Cl. 88—14)

This invention relates to a new type of optical element. To distinguish it from lenses, mirrors, prisms or other elements, a new term has been coined and is now commonly used by optical engineers following a paper presented March 19, 1953, before the convention of the Optical Society of America; see Abstract 21, page 238, Journal of the Optical Society of America, April, 1953, vol. 43, No. 4. The word is "Axicon." Reference is also made to "The Axicon: A New Type of Optical Element," Journal of the Optical Society of America, 44, pages 592–597, August 1954.

This term has been in use for some time in the development of the various ramifications and modifications of the present invention and the definition of the term as so used will be fully explained below. The principle of the formation of an axicon image will be described, various examples of axicon types and combination of axicons with lenses and mirrors will be given. The present invention is not the broad principle of the axicon but rather the combination of an axicon with other elements producing a novel optical aligner, operating on a novel principle. Accordingly, the term "axicon" will be used throughout this specification and accompanying claims in its generic sense.

Thus the invention relates particularly to optical aligners such as transits and more particularly to high precision aligners such as are required in checking precision tools for milling, grinding, boring and the like. The primary difficulty with prior high precision aligners was the inability to maintain their accuracy when the focus is changed from distant to nearby objects. An axicon stays in focus over any preselected range even out to infinity. In fact, the range is so great that certain embodiments of the invention purposely sacrifice part of it for the sake of image brightness, or for uniformity of magnification, or to combine the instrument with a relatively wide field view finder.

Thus the primary object of the invention is to provide an optical aligner which does not have to be focused to accommodate objects at different distances.

The objects and advantages of the various embodiments of the invention will be set forth in connection with the drawings, the first twenty-eight figures of which have to do with axiconics in general and the remainder have to do with aligners according to the present invention. In the drawings:

Figs. 1, 2, 3, and 4 illustrate the formation of an axicon image.

Fig. 5 shows how a toric lens forms both a lens image and an axicon image.

Figs. 6–11 are cross sections of various forms of simple axicons, Figs. 9 and 11 showing the combination of an axicon and a lens.

Fig. 12 illustrates the operation of a reflecting axicon.

Figs. 13–16 inclusive illustrate in cross section certain unusual types of axicons.

Fig. 17 is a schematic and somewhat exaggerated illustration of the operation of an axicon, particularly with reference to the calculation of image brightness.

Figs. 18–24 inclusive illustrate the manner of computing image brightness and the range of axicon images from various forms of axicons, Fig. 24 being the illustration of a simple lens for comparison with the axicons shown in the other figures.

Figure 25:
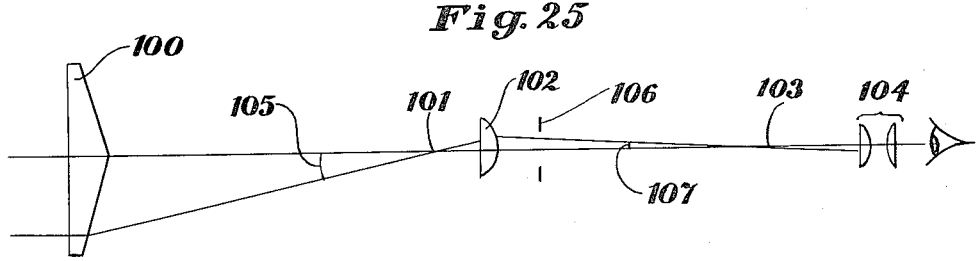

Fig. 25 illustrates the operation of an aligner in which a microscope is used to view the axicon image.

Figure 26:
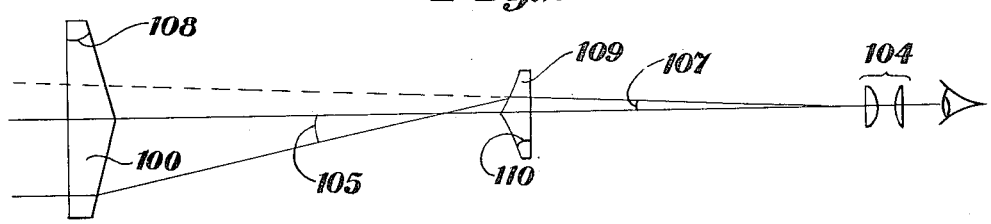
Figure 27:
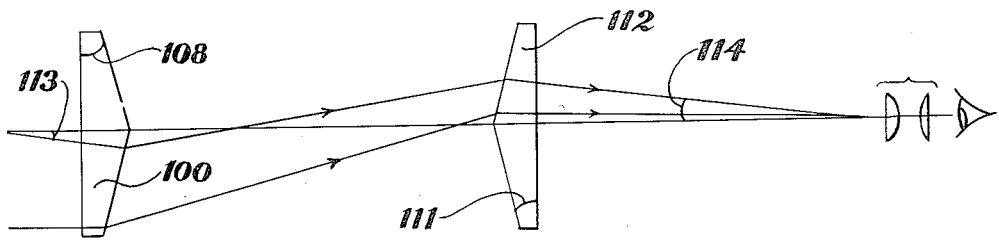
Figure 28:
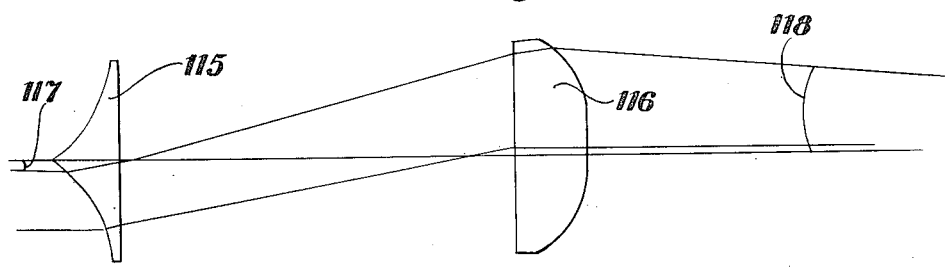

Figs. 26–28 similarly illustrate how the effective brightness of the axicon image may be increased by substituting a second axicon for the objective of the microscope.

The remaining figures relate to optical aligners comprising a point source of light, an axicon for forming an axicon image of this source over a range of points along the axis, and a fiducial mark such as a crosshair within this range of points, together with an eyepiece or microscope for observing the registration of the axicon image with respect to the fiducial mark.

Fig. 29 illustrates a highly efficient point source of light including means for adjustably mounting the source on a work table or similar object.

Fig. 30 similarly illustrates a cone-type axicon with a similar mounting.

Fig. 31 illustrates a fiducial mark and microscope similarly mounted.

Fig. 32 illustrates an embodiment of the invention in which the light source is movable along the object to be tested.

Fig. 33 illustrates an embodiment of the invention employing a plurality of sources.

Fig. 34 illustrates an embodiment of the invention in which the fiducial mark and viewing means are movable along the surface to be tested.

Fig. 35 illustrates a system in which both the source and the fiducial mark move relative to the axicon, which in this case is a reflecting axicon.

Figure 36:
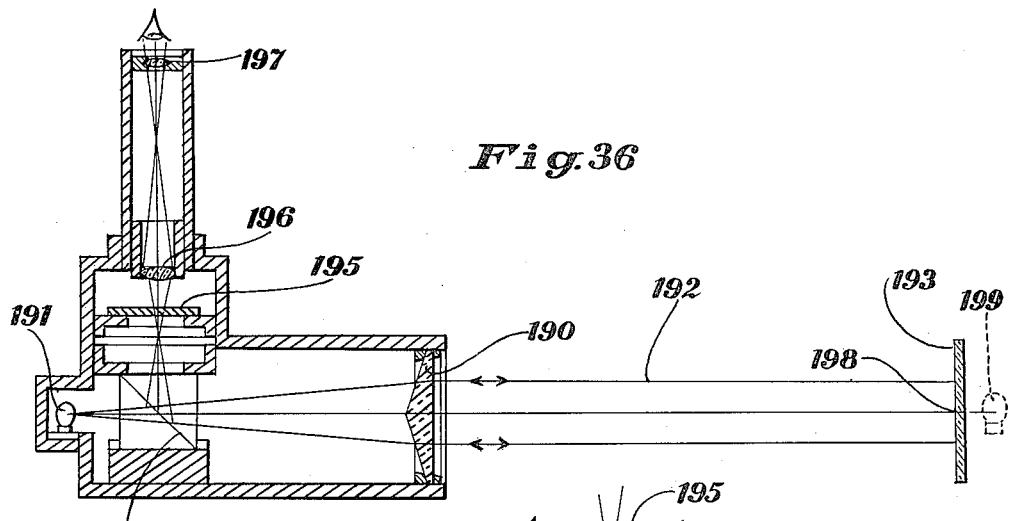
Figure 37:
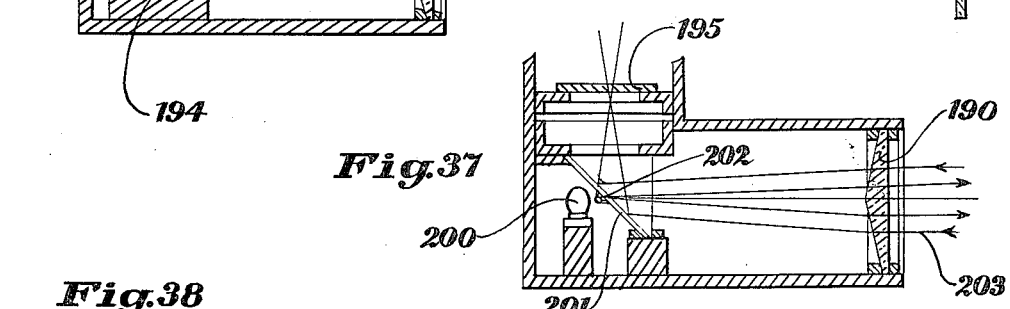

Figs. 36 and 37 illustrate in cross section simple autocollimators, or more exactly the axiconic equivalent thereof, incorporating the present invention.

Figure 38:
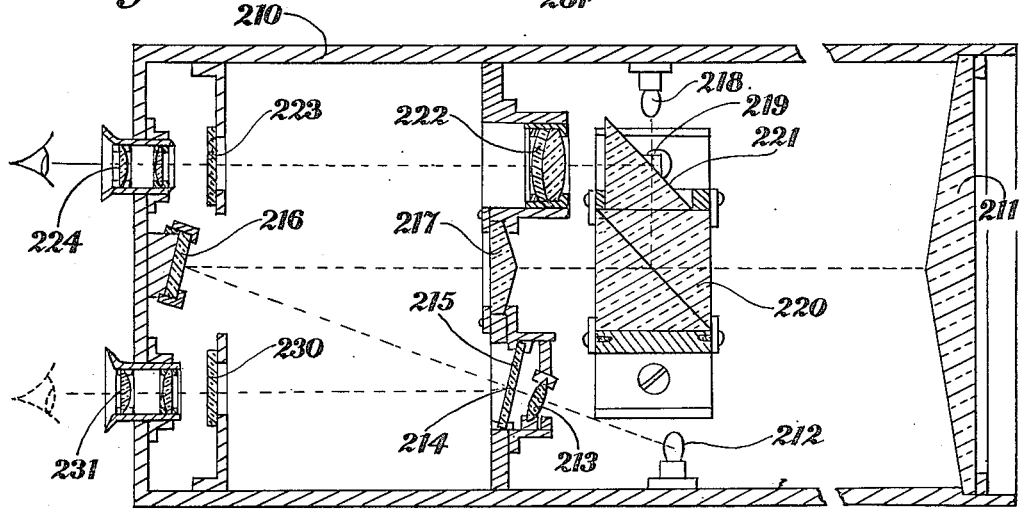

Fig. 38 illustrates a duplex form of telescope according to the present invention which may be also converted to an autocollimator or to an axiconic projector.

Figs. 39–46 inclusive illustrate alternative forms of the axiconic objective used in the telescope shown in Fig. 38 and various attachments for the telescope.

Fig. 47 illustrates schematically a special form of the invention particularly useful for checking the alignment of compound boring machines.

Fig. 48 illustrates a preferred form of axiconic duplex telescope with view finder according to the invention, which may be converted to an autocollimator.

Fig. 49 illustrates a complete optical aligner incorporating the telescope shown in Fig. 48.

Figure 50:
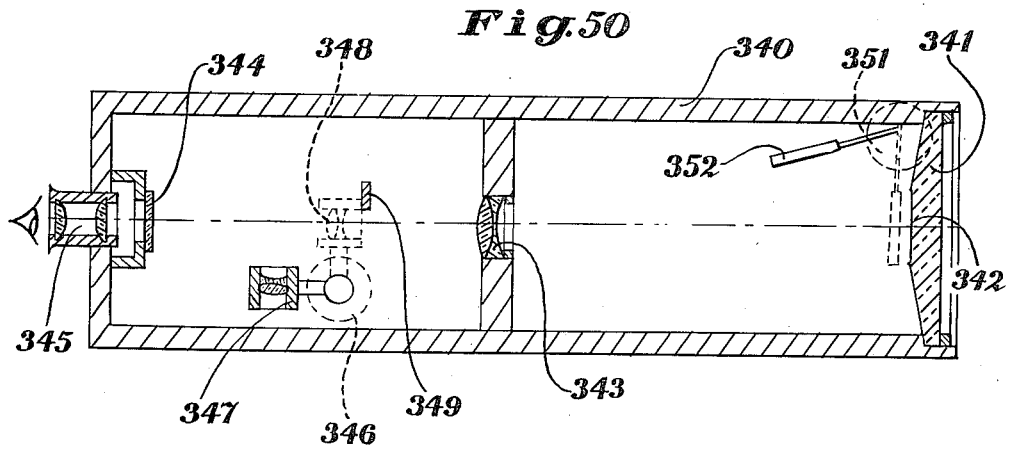
Figure 51:
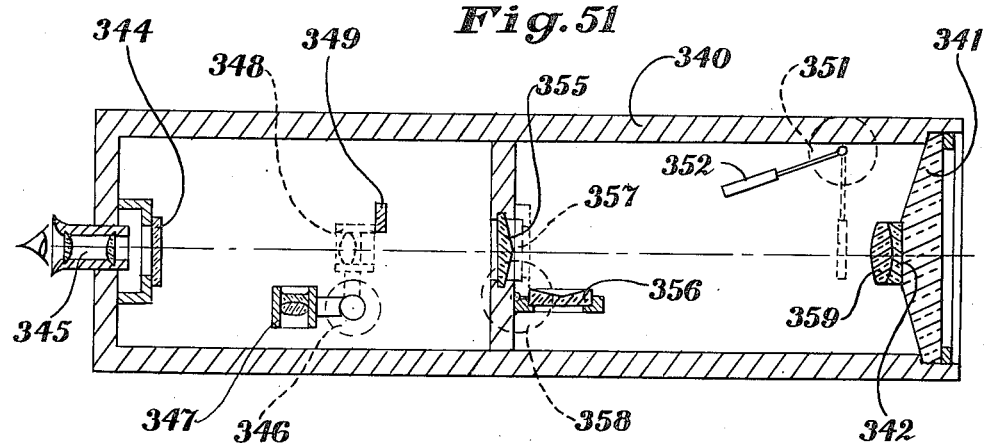

Figs. 50 and 51 illustrate axiconic telescopes with simple but effective view finders.

*Principle of the axicon*

The word axicon has been coined to cover a type of optical element. All axicons are, at least approximately, figures of revolution. They have the common property that a point source on the axis of revolution is imaged by the axicon to a range of points along the axis. This image is real but is not a definitely focused one in the sense of an ordinary objective or lens image. Axicons do not have a definite focal length; apparent exceptions to this rule will be mentioned at the end of this specification. The name axicon is derived from "axis image." Axicons will form images only of small bright sources like lamp filaments or brightly illuminated pin holes. The image is in general just a point image, but a filament of special shape will be imaged so as to have that particular shape.

A problem of long standing in optics has been to provide a telescope, such as for a transit, that will focus for close distances without having to move any parts. The objection to moving parts is that they disturb the alignment of the optic axis, at least sufficiently to disturb the adjustment of a precise instrument. According to the present invention optical aligners are made up using axicons so as to overcome this problem. In general an axicon image does not have a diffraction pattern associated therewith but highly precise axicons do show a diffraction pattern along with the axicon image. This point is mentioned since it was an effort to use diffraction images for alignment of compound boring machines, that led to the discovery of the axiconic principle. It was only after several entirely different forms of axicons were then discovered that the principle of the operation of the axicon was formulated. Although the axiconic phenomenon may have previously been noted by optical workers, the subject has apparently never been included in any standard textbooks and no practical application of the principle has ever been made. In fact, the word axicon had to be coined before the subject could be discussed properly. It is for this reason that a complete discussion of axiconics is given in the present specification before a discussion of an optical aligner incorporating an axicon. This general discussion will cover the computation of image brightness and image range or depth of focus, all of which has a direct bearing on preferred embodiments of the invention.

Before describing specific forms of axicons, the characteristics common to all axicons are outlined below. The effect of light traveling in radial sheets from a ring or disc will first be discussed and then ways of producing such an arrangement of light rays will be given.

An axicon always involves a ring or disc through which light is passing or from which light is emerging (either actually or virtually). Such a ring is illustrated at 10 in Fig. 1. Various ways of getting the light into the ring 10 so as to come out as radial fans or radial sheets are discussed below and in the Optical Society Journal mentioned above, but first, the effect of such a ring is analyzed since this is a form of the axicon effect no matter how the ring is produced. Light from point 11 of this ring passes outward in a fan-shape illustrated by a wall 13, which for the purpose of this illustration is given a finite thickness. This fan of light cuts the axiconic axis 15 at all points between that marked 16 and that marked 17. If the upper edge of the fan 13 were parallel to the axis 15, the point 17 would be at infinity. If the upper edge of the fan 13 went upward from the point 11, the far point of axial intersection would be "beyond infinity," i. e., behind the axicon. Similarly light from the point 12 of the axicon ring 10 spreads out in a horizontal fan or table 14, also intersecting the axicon axis between the points 16 and 17. A screen or sheet of paper orthogonal to the axis 15 between the points 16 and 17 would have to receive two lines of light indicated at 13 and 14 in Fig. 3. Since all points of the ring 10 send out similar fans of light, the effect is illustrated in Fig. 4 wherein the axis point 15 receives light from every point on the ring 10 whereas any other point within the circle shown in Fig. 4 will receive light only from two opposite points of the ring 10. In general the intensity of the light is so small that no image whatsoever can be seen except at the point 15 which receives an overwhelming preponderance of the light. Thus the image is not formed in the sense which an ordinary lens forms an image but rather the image is merely due to the preponderance of the light as compared to the amount of light reaching any other point on the screen or the image plane under examination.

Fig. 2 illustrates the similar effect from an axicon represented as a disc 20, all points of which including the periphery send light only toward the axis. The two sheets of light 21 and 2 illustrated in Fig. 2 intersect the axis 23 at all points between the point 24 and the far point 25 which may be at infinity or as far out as one desires to have it.

Fig. 5 illustrates a toric form of axicon in which light from a point 30 is focused by a toric lens 31 to form a ring image 32. However, the light from the toric lens 31 passes through this ring image 32 and the light from each point of the ring image 32 proceeds only in sagittal planes such as 33, intersecting the axiconic axis 35 at all points between the point 34 and infinity. Thus the toric lens 31 forms both a lens image 32 and a range of axiconic images on the axis 35.

The same effect is obtained with a negative toric lens as shown in Fig. 6 or a somewhat weaker negative toric lens as shown in Fig. 7. Fig. 8 illustrates a cone in cross section which, when the incident light is parallel, gives planes or sheets of light of the type illustrated in Fig. 2. Fig. 9 shows the combination of such a conical axicon with a relatively weak positive lens. This tends to alter the range of the axiconic images, bringing the point 25 of Fig. 2 closer to the point 24 but at the same time it increases the brightness of the images within this range. Fig. 10 illustrates a positive toric lens, similar to Fig. 5, but omitting the inner half of the toric which only spreads the light outward and thus does not contribute to the axiconic image, unless combined with a positive lens. Fig. 11 illustrates in cross section the combination of a weak positive lens with a negative cone. There is a certain similarity between lenses and axicons in that a negative lens alone cannot act as an objective unless combined with a positive lens and negative cones alone cannot act as axicons unless combined with a positive lens. The performance of these different types of axicons will be discussed in connection with Figs. 18–23.

In Fig. 12 light from a point source 41 strikes a conical reflector 40 and is reflected from all points of the reflector so as to intercept the axis of revolution of the reflector thus forming axiconic images over a range of points such as 42 extending from the center 44 of the reflector 40 to a point 43. In practice a plano-conical glass lens is used to form the reflecting axicon. Either surface may be coated with aluminum to be totally reflecting. In either case the light passes twice through the transparent material of the cone. When the plano surface is reflecting, the light is refracted twice by the conical surface, once as it enters and once as it leaves. When the conical surface is reflecting, the light will be reflected by that surface, very much as shown in Fig. 12, and will be twice refracted at the plano surface. As will be described later, a beam splitter may be used so that the point source 41 and the crosshairs for viewing it are coincident and will remain in coincidence as they are moved toward or away from the conical reflector. In this case the image always remains at unit magnification for any distance out to its maximum range. Incidentally, if the optics are perfect enough to produce a diffraction pattern around the axiconic image, the diffraction pattern will also remain unchanged. The illuminance will be inversely proportional to the first power of the distance, not to the usual second power. The question of illuminance for all types of axicons is discussed in greater detail in connection with Figs. 17–24.

A highly polished cylinder as illustrated in Fig. 13 having a reflecting inner surface 45 constitutes an axicon. Light from a point source 46 on the axis of revolution is reflected by this inner surface to form axiconic images on the axis between the points 47 and 48. As illustrated by the ray 49, the light may suffer two or more reflections before reaching the image. Actually the near point of the image is not the point 47 but is rather some point near that at which the ray 49 first crosses the axis within the cylinder itself.

Internally reflecting tubes as axicons may take the form of a frustrated cone as shown in Fig. 14 or more elaborate forms such as the curved cone shown in Fig. 15.

These types form excellent axicon images. Even in the horn-like structures double reflections may occur. Fig. 16 illustrates a quite interesting form of axicon 51 which is actually a hollow sphere of refracting and surface reflecting material. It has the unique feature of forming axicon images out to any field angle. Every line through the center 57 of the sphere is an axis of revolution. Thus any point such as the point 52 on the axis 56 is imaged by the sphere 51 to form a series of axicon images along the axis 56 between the points 53 and 54. The rays forming the axicon image, in general, suffer one internal reflection at either the inner or outer spherical surface as shown.

One very simple form of axicon not illustrated consists of concentric grooves on a plano surface. These grooves may be produced simply by mounting a disc of glass on a lathe and scratching it with sandpaper to give a multitude of circular scratches. The windshield wiper on a car after many years of use produces a somewhat similar effect. Such a surface is an axicon but is not optically as efficient as some of the forms discussed above and therefore this form is not illustrated. Molded fresnel lenses often contain concentric imperfections which form axicon images quite independent of the lens image formed by the fresnel itself.

*Brightness of axicon images*

Fig. 17 is included to illustrate how image brightness may be computed. It is applicable to all types of axicons and therefore no particular one is shown in this figure. A mask 61 having a pinhole opening 60 is placed over the axicon so that only the light from a very short section is allowed to pass through the pinhole 60 shown in perspective in front of the optic axis of the system. It is convenient to think of this axicon section as a tangential (vertical) cylinder at the point 60. The incident light from the source 62 arrives normal to the direction of the axis of the assumed cylinder because it comes from a point on the optic axis of the system. All of the refracted light will be substantially normal also to the direction of the cylinder by the first law of refraction. Thus the light leaving the latter element 60 fans out and the plane of the fan will pass through the optic axis so that some light reaches a continuous range of points along the axis. All other elements of the axicon also send some light along the axis. Conversely, if a point is to receive light from all parts of the axicon, the point must be on the axis. The illuminance across the strip of light produced by the element 60 is not uniform. The center of the strip between the points 66 and 67 receives light from points all across the horizontal diameter 65 of the source 62. The edges 68 and 69 receive light only from the small areas 63 and 64 at the edges of the source. The vertical distribution therefore is proportional to the length of a horizontal chord across the circle 62 or to $\sqrt{r^2-s^2}$ where $r$ is the radius and $s$ is the vertical distance from the center of this circle. When we transfer this to the image strip 70, $r$ becomes the half width of the strip and $s$ the distance out from the center of the strip. Thus we have the factors on which to base calculations of the distribution of illuminance over the screen when all elements of the axicon are added up.

In order to find out what factors govern the absolute illuminance, the fundamental laws thereof are applied, namely, that the illuminance at a point on the screen is the product of the luminance of the source times the solid angle subtended at the point by the source or its image.

In Fig. 18, the specific case of a circular toric lens 71 is considered. At the point 81, there is formed a virtual image of the source 80. This image when viewed from a point 92 on the axis, appears as a circle of light constituting the ring image. Referring to the angular diameter of this image as 2R where the angle R is indicated at 90, and its angular thickness as T, represented by the angle 91, the solid angle subtended at the point 92 is then proportional to $2\pi RT$ and the illuminance is proportional to $2\pi RTB$ where B is the luminance of the source 80. The value of R is dependent on the apparent size of the ring image 81 and on the distance from the ring image to the point 92. The closer the point 92 is to the ring image, the larger the angle 90 becomes, i. e., the larger R becomes. The angle 91, i. e., the angular thickness T, is determined by the thickness of the image 81 and also by the distance to the point 92. Thus the illuminance varies inversely as the square of the distance from the ring image 81 to the observation point 92.

The same calculations apply to the weaker toric lens 72 shown in Fig. 19 which produces a ring image 82. Various factors may be varied in order to produce brighter axicon images. The value of R can be made larger by having a larger axicon. This is similar to ordinary lenses except that the illuminance will be proportional to the first power of the diameter instead of to the square of the diameter of the optical element. The thickness T of the ring image depends on the size of the source 80 and on the magnification caused by the axicon. It is quite surprising to find that image brightness depends on the size of the source. However, a simple direct experiment proves this to be the case. An iris diaphragm placed over an extended source will cause an axicon image thereof to change markedly in brightness as the diaphragm is opened and closed. This is, of course, quite a surprising property of axicon images.

The magnification factor also has proven to have the effect predicted by the above calculations. To increase the size of the image 81 or 82, the toric lens must have a longer focal length and therefore a longer radius. However, this causes the image 82, for example, to be farther from the point 92 than is the image 81 and therefore there is a tendency for the image to appear smaller. However, the point 92 is always farther from the image than the distance from the image to the toric and therefore there is always a net gain in angular size when longer focal length toric lenses are used. That is, the apparent angular size of the image 82 is greater than the apparent angular size of the image 81.

This raises the question of how great the radius may become. In Fig. 20 the radius of the toric has become infinite and the axicon has become a cone 73. The image 83 appears substantially in the plane of the source 80 and has an apparent width the same as the diameter of the source 80. Thus the cone is more efficient than the toric forms of an axicon.

This in turn raises a question as to whether it is possible to go further and make the radius positive and thus gain still more in illuminance. Positive toric lenses are a little difficult to manufacture, although not impossible. On the other hand, the same effect is easily realized by putting a positive radius or convex spherical surface on the opposite face of the cone 74 as shown in Fig. 21. In this case the ring image 84 has become real and is off to the right of the drawing. The solid angle 91 as seen from the point 92 is larger than before and thus there is a gain in illuminance.

Carrying the mathematical developments still further, a positive toric 75 with short positive radius is shown in Fig. 22. The image 85 in this case is real rather than virtual but is quite small so that the solid angle 91 is small as seen from the point 92. In fact this arrangement approaches the case of Fig. 18 for the strong negative curve. Somewhere between the cases represented by Figs. 21 and 22 is the optimum illuminance. Fig. 22 can be drawn in the form shown in Fig. 23 in which the axicon is a negative cone with a spherical front surface. That is, a strong positive curve is first drawn and then it is found that a negative cone is required in order to bring the light from the source 80 to the point 92 at the angle 90. Again a real image 86 is formed and the apparent angular size represented by the angle 91 is quite large.

Fig. 24 is included to show an ordinary convex plano lens designed with the same restrictions placed on the above axicons, but, of course, the solid angle 91 seen at the point 87 is the familiar cone of light from the whole lens. Since this angle is quite large, the image 87 is quite bright, but, of course, it is not an axicon image at all and it occurs only at the point 87 rather than at a range of points along the axis. An ordinary lens having spherical aberration has a range of images of relatively poor focus. That is, a point source is imaged as a small disc within the range of the spherical aberration. Careful examination of such an image will reveal at the center of the circular patch which constitutes the image, a tiny bright point of light. This corresponds to the axicon image of the point source, but, nevertheless, lenses even with large amounts of spherical aberration are not considered to be axicons. The point is mentioned merely as an academic curiosity.

The various factors which affect brightness also have a bearing on the range of focal lengths or the range in which axicon images are found along the axis. This range may be defined in terms of a source at infinity. The parallel rays 93 shown in each of the Figs. 18 to 24 inclusive represent rays from a source at infinity and the divergence of these rays after they pass through the axicon is a measure of the range of focal lengths. In Fig. 18 the range is from a near point out to infinity and beyond to the virtual. In Fig. 19 the range is from zero to infinity. In Fig. 20 the focus is limited to the range from zero to some distance F where F depends on the cone angle A of the cone 73 and its diameter D. F approximately equals $$\frac{2_D}{A}$$

for small cone angles where D is expressed in radians. The ring image is virtual and is located around the source at infinity.

At Fig. 21 the rays from infinity form a real image. The focal range is restricted from zero to some distance F but within this limited range the illuminance is high because the real image is large and is close to the observation point, all as discussed above. The range is limited greatly as shown in Figs. 22 and 23 and finally in the case of a lens as shown in Fig. 24, the range of foci has been reduced to zero and the illuminance is a maximum. In fact, Fig. 24 does not relate to axicons but rather to ordinary lenses.

The cone shown in Fig. 20 has a number of interesting properties. One is that for a source at infinity, the illuminance in the axicon image remains constant for all positions of the image. It does not vary at all with the distance from the axicon. This is because the ring image is always at infinity for all zones of the cone and therefore always subtends the same solid angle. Although the illuminance remains the same, the image size is smaller close to the cone. This means that there is less total energy in the image close to the cone than in an image distant from the cone. This gives rise to the rather unusual phenomenon that the visibility increases with increase in distance from the cone. This surprising result is easy to prove simply by observing the image of the sun formed by a cone. When a positive lens is added as in Fig. 21, the illuminance itself at the image increases with increase in distance from the cone. Thus it will seem that axicon images have a number of peculiar properties not found in lens images.

Interference phenomena

Axicon images do not necessarily involve interference or diffraction of any type. With simple axicons it is not possible to observe any diffraction pattern. However, it is recognized that if axicons are made perfectly enough, particularly the toric lens and cone types, there should be, and in practice are, certain interference patterns. With a substantially perfect cone 3 inches in diameter and 6 feet maximum focus, it has been possible to produce a beautiful pattern of diffraction circles around the axicon image. It has been observed that the diameters of the diffraction rings remain constant for all positions of the observing microscope. Actually the visibility close to the cone is quite low so that the diffraction patterns are more easily seen at points distant from the cone. In the axicon, the central spot is smaller than for an Airy disc and there are many more concentric rings visible than originally predicted by Airy in any simple diffraction pattern. This is another unique property of axicons. The small size of the nucleus favors extreme accuracy in the positioning of axicon optics. It is quite possible in practice to observe these precisely formed images over a range of 100 feet or more.

Compound axicons

In Fig. 25 there is shown a simple axicon telescope in which an axicon 100 forms an axiconic image 101 which is viewed by a microscope consisting of an objective 102 and an eyepiece 104. The objective 102 merely serves to relay the axicon image 101 to the point 103 in the field of the eyepiece 104. The axicon 100 forms a virtual ring image around the source and this ring image is focused by the lens 102 to form a real image 106. The magnification in the microscope is determined in terms of the incident angle 105 and the refracted angle 107. In the substitution which is to be discussed in connection with Fig. 26, the first effort will be one in which the magnification is held the same as with the simple microscope.

In Fig. 26 the objective 102 of the microscope is replaced by a cone 109 having a cone angle 110 as compared with the cone angle 108 of the primary axicon 100. Thus an axicon is used to relay the first axicon image. However, before considering the advantages of this substitution, which have to do with a gain in illuminance, the required cone angles 108 and 110 are computed. For convenience it is assumed that the index of the material is 1.5 and that the angles are small so that the sine of the angle can be replaced by the angle itself. Thus the angle 108 equals twice the angle 105. The deviation produced by the cone 109 must be the sum of the angles 105 and 107. Therefore the angle 109 must equal twice this sum. Replacing the angle 107 by the angle 105 divided by M (the magnification) it will be seen that the ratio of the cone angles 109 to 108 is $$1+\frac{1}{M}$$

Therefore in order to get a high magnification, the angle 109 must be only slightly larger than the angle 108. It is interesting to compare the illuminance in the two cases. The spherical microscope objective shown in Fig. 25 forms a real ring image 106 as mentioned above. All of the angular dimensions of this real image as seen from the point 103 are reduced by the magnification M of the objective as compared to the angular dimensions of the virtual ring image produced by the cone alone. The illuminance at the point 103 therefore is reduced by $M^2$ compared to what it would be at the point 101. On the other hand, when the cone 109 is used as shown in Fig. 26, the ring image will remain a virtual one surrounding the source. Its angular diameter will be reduced from twice the angle 105 to twice the angle 107. That is, the angular diameter will be reduced M times. The thickness of the ring, however, is not changed by the addition of the second cone. Therefore, the illuminance is reduced only by the first power of M. Thus there is a very substantial gain in illumination by using a cone instead of the usual microscope objective. For a 10-power objective the gain would be 10 times.

The most surprising case of the use of two cones arises when both cones 100 and 112 as shown in Fig. 27 have the same slopes. That is, angle 108 equals angle 111. The magnification for the complete system is thus unity, the angle 113 equals the angle 114. And, what is most important, this magnification is unity for all object distances and for all viewing distances. Stated another way, since both cones produce the same deviations, any ray that crosses the axis between the cones suffers two deviations which are opposite so that the incoming and outgoing rays are always parallel to each other and so from the sine law, the magnification is unity. Similar triangles in the figure will also show that the magnification produced by the first cone is always reciprocal to the magnification produced by the second cone.

In practice it has been found that the field of view of two such cones is quite limited. However, the brightness, as predicted, is considerably greater. When the two cones are of equal angle, the image does remain the same size as the object over the whole useful range. Actually at great distances, the second cone is being used very close to the very tip of the cone and the inability of making a perfect tip on the cone results in deterioration of distant images. For example, one such pair of cones gave excellent images out to about 40 feet, but beyond that the image was less useful. The field of view was about 2 mm. wide for all object distances up to 40 feet. To avoid any possibility of erroneous readings, the very tip of the cone is sometimes purposely flattened and the double cone system is then used only with the more limited range in which the images are substantially perfect.

The balancing of the axiconic effects or refracting power of one cone by another is obtainable, at least theoretically, with all types of simple axicons. Fig. 28 is included to show a toric axicon 115 together with the balancing axicon 116, i. e., an axicon whose total refracting powers for each ray balances that of the first axicon. To calculate the shape of the balancing axicon, a ray or series of rays are traced and the toric surface of the lens 116 is computed to make the emergent angle 118 equal to the incident angle 117 for each ray. In general, balancing axicons are only used in the case of cones since there is no point in attempting to gain in illuminance one way, i. e., balancing axicons, unless a high order of illuminance has already been obtained by using an efficient axicon in the first place, such as a cone.

*Optical aligners*

The surveyor's transit has been mankind's most useful instrument to provide optical straight lines. It has one difficulty in that it has to be focused when used at close range and this focusing necessitates moving an element that plays a part in defining the line of sight. Great care therefore must be taken to build the instrument so that this focusing motion is in a perfectly straight line parallel to the line of sight. When an axicon is used as the objective there is nothing to move in focusing and thus the greatest difficulty of optical aligners is eliminated.

It is, of course, realized that one cannot overlook any of the critical factors which have to do with determining the straightness of the line of sight in question. It the case of axicon, different distances are focused by different zones of the axicon. If the line of sight is to be absolutely straight, each zone must be centered about the same axis as all of the other zones. It has been found that it is quite easy to insure that all zones of an axicon do have the same axis. A simple check on this, in the case of precisely made axicons, is the fact that diffraction patterns are produced over the complete range of the axicon image.

Axicons may be made up as telescopes in which the axicon is directly associated with the fiducial mark or crosshair and the ocular microscope used for viewing the crosshair. In this case the point source of light is usually at a considerable distance from the axiconic telescope. Secondly, axiconic aligners may be made up as projectors or collimators in which the axicon is closely associated with the point source of light and the projected image is viewed at considerable distance. Also, axiconic aligners can be made up as autocollimators and in special forms can use reflecting axicons. The point source, the axicon, or the fiducial mark can be moved in making a test or any one of them may be held steady and the other two moved. The preferred systems will be discussed below.

One versatile form of axiconic aligner is illustrated in Figs. 29, 30, and 31 in which each of the important elements is mounted for separate movement, positioning and/or adjustment. In each case each element is mounted on a table 120 whose level may be adjusted by simply turning knobs 121 which extend or retract the three legs of the table, two of which are shown. A second table 122 is carried by the base table 120 and is mounted for vertical adjustment by means of a knob 123. A third table 124 is mounted for transverse adjustment on the vertical moving table 122, the transverse adjustment being provided by a worm turned by knob 125. In Fig. 29 a lamp 130 having a small source of light is focused by a lens 131 on a pinhole 132 which acts as the point source of light of the aligner. All of this is carried in a suitable house 133 provided with vents to prevent overheating of the lamp 130. In Fig. 30 a conical axicon 140 is carried in a mount 141 and is adjustable therein by means of three screws 142 which orient the cone 140 against the pressure of springs 143. In Fig. 31 crosshair or reticle 145 is vertically adjustable by means of a suitable screw 146 and is observed through a microscope 147.

*Axicon telescopes*

The direct application of the axicon telescope is shown in Fig. 32. A simple low-power telescope consisting of an axicon objective 153 in the form of a cone, a pair of crosshairs 154 and an eyepiece or microscope 155 is mounted on a suitable support 156 and is held there rigid relative to the ways 150 of a machine tool which are to be tested for flatness. It is interesting to note that the objective of the microscope 155 may be a single element lens provided the crosshairs 154 are placed in front of the ocular of the microscope instead of in front of the objective. In the Fig. 32 a light source 152 is carried in the chuck 151 of a boring machine which moves along the ways 150 while the alingment thereof is being checked. Alternatively, the light source may be mounted in a housing 157 corresponding to the Fig. 29 and moved along the ways 150 without reference to the tool itself. An axicon telescope consisting of a cone 6 inches in diameter and a 100-power microscope has been found to be extremely accurate. A simple exciter lamp from a sound motion picture system can be used as the source without condenser lenses or pinhole mask. Such lamps have a straight coiled filament about .006 inch in diameter. At a distance of 100 feet a position of the target filament with this axiconic telescope can be determined to less than .001 inch with a single setting which means that the accuracy in terms of angle is an accuracy of ⅕ of a second of arc.

With smaller, brighter sources such as the zirconium arc, even more astonishing accuracy can be obtained. When the source is brought close to the telescope, say 6 feet away, the image becomes quite large and the contrast is reduced. However, the accuracy of the reading remains high and the only limitation depends upon the objection the observer may have to the size of the image. Even this limitation may be limited by using a lower power ocular in the microscope which is permissible providing the crosshairs are accurately located and not disturbed by change in the ocular. Another remedy is to use a cone in place of the microscope objective as has already been discussed in connection with Fig. 26.

One method of determining the levelness of a machine bed such as 150 is to set up the axicon telescope so that the axis thereof is level. This may be checked by a suitable spirit level. The light source is then placed on the machine bed at some point, say near the telescope and is adjusted vertically to register with the crosshairs of the telescope. Then as the target or light source is moved along the bed to different stations, the height of the source is adjusted until it registers with the crosshairs of the telescope and a micrometer or dial guage measures the adjustment to give the elevation of each station. On the other hand, levelness may be unimportant as compared to having the machine bed flat. In this case a spirit level is quite unnecessary. Two points on the bed, preferably one on each end, are taken as references. The telescope is adjusted until it is aligned on the target or light source at either end of the machine bed.

Since alignment of a telescope with a target at two different positions is time consuming, it is noted that the axicon has a very interesting property which simplifies this procedure greatly. The property is that two targets can be seen simultaneously and with full brightness even if one is exactly behind the other. Such an arrangement is shown in Fig. 33. In this figure two point sources of light 160 and 161 are set up simultaneously at opposite ends of the machine bed 150. Light from the source 160 passes around the source 161 and is picked up by the marginal areas of the axicon 153. Light from the source 161 enters the paraxial portion of this same axicon and the images of both sources are in axiconic focus on the crosshairs of the axicon telescope when proper alignment has been established. Either of the sources may then be moved along the machine bed, or a third source 162 may be added for checking the alignment at intermediate points without disturbing the two sources 160 and 161. The two sources 160 and 161 provide a constant check on the alignment of the axicon telescope itself while the intermediate source 162 is moved up and down the machine bed for checking the flatness thereof. The small bulbs used in hand flashlights set on narrow posts make excellent light sources for the arrangement shown in Fig. 33. The sources are all adjusted to be exactly the same height above the base. In practice this is done by placing them successively at the same position, and then checking the height by the axiconic telescope.

A rather common type of problem is the checking of the alignment of cylinders such as bearings for a shaft. This problem is similar to that of checking the straightness of a bed. In this case the target light is placed on the exact center of each cylinder. Two such lights may be used as reference sources similar to lights 160 and 161 in Fig. 33 and the other cylinders may then be checked for alignment or may be adjusted to be brought into proper alignment.

*Axicon projectors*

A second general type of axiconic aligner involves a projector or collimator. In this case the point source of light and the axicon are fixed relative to one another and the axicon image formed thereby is observed at some distance from the projector. A small source of light is used such as by using a small lamp or a pinhole in the mask in front of a larger lamp or the effective size may be reduced by suitable spherical lens or by an axicon. This small source is placed just within the maximum focus of an axicon objective. The system projects an axial image out to infinity. If a single cone is used as the axicon, the image is very small just in front of the cone and gets larger at greater distances from the cone. The image may be caught on a ground glass, but for measurement purposes, it is best to observe it with a magnifier or even with a microscope. In general, crosshairs are mounted at the focus of the viewing optic. For example, such an arrangement is shown in Fig. 34 for measuring the straightness of the machine bed 150. In this case the chuck 151 carries crosshairs 165, a mirror 166, and a microscope 167 for observing the crosshairs. An axiconic projector consisting of an axicon 168 which may or may not have a positive lens 169 associated therewith for the reasons set forth in connection with Fig. 21, and a pinhole 170 illuminated by a lamp 171, are mounted on a support 172. Alternatively the axiconic projector may be mounted directly on the machine bed 150 as shown by broken lines 173. The projector may be made up of the units shown in Figs. 29 and 30. Also, the viewing system may be mounted directly on the machine bed as shown by broken lines 175. The alignment of the projector is checked with the crosshairs at one station on the machine bed and is also checked either for levelness by means of a spirit level or with the crosshairs at another station on the machine bed all of which is very similar to the use of the telescope described in connection with the use of Fig. 32. Once proper alignment is thus established, readings taken at intermediate or extrapolated points along the machine bed give directly the departure of the bed from linearity with the two chosen points or the departure from levelness.

The use of two equal or balancing axicons has been discussed in connection with Figs. 25 to 28. The field of view of the double cone system is quite small. In the case of an axiconic telescope, this restricted field of view renders the use of the instrument somewhat troublesome unless a separate viewfinder is used. However, this objection is not found in the case of the axiconic projector. The narrow field is of no consequence because the source is permanently lined up with the two cones in the instrument. Of course, the equal cones limit the range, but by using a cone near the source which is slightly larger than the objective cone, the projected beam goes out to a great distance with only a very small increase in size. This double cone projector system is discussed further below in connection with an autocollimator which is both an axiconic projector and an axiconic telescope.

The projector type of aligner has still another advantage for some applications in that accurate readings can be taken very close to the objective cone. If adjustments are to be made to a structure at various points to put it in line, it is an advantage for the person making the adjustments to be able to make his own observations. This is the situation when a projector is used, but when a telescope is used, the person making the adjustments to the moving light source has to be told by the person at the telescope whether or not the degree of adjustment is correct. On the other hand, the telescope is particularly useful in the observation of the inside of a long bore where it is not convenient to observe the projected image. As a matter of fact, the energy in the image is sufficient to be located photoelectrically if desired.

*Reflecting axicons*

Fig. 35 illustrates one particularly useful form of axicon aligner, namely the reflecting cone. In the example shown it is used to check a lathe by mounting the reflecting cone 180 in the headstock 151 of the lathe. Thus the source and the crosshairs both move with respect to the axicon which in this case is fixed except for rotation. As pointed out above, magnification of this system is constant and is unity. The source and the crosshairs are fixed relative to one another. The relative motion is between these two units and the axicon which is thus different from either the axiconic telescope or the axiconic projector. In the drawing light from a source 181 illuminates a pinhole in a totally reflected mirror 182. The light from the pinhole strikes the axicon 180 which reflects the light and after a further reflection by mirror 182, this light forms an axiconic image in the plane of the crosshairs 183. The axiconic image and the crosshairs are observed by a microscope 184. The source, the semi-transparent mirror, the crosshairs, and the microscope are all carried on a support 185 arranged for smooth motion along the bed 150 of the lathe.

First it is noted that when the image of the pinhole covers the pinhole, this pinhole is optically on the axis of the cone 180. The reflecting cone is mounted on the lathe spindle. When the observing microscope is focused on the pinhole, the return image is the same size as the pinhole. Both lateral and tilt adjustments of the cone with respect to the spindle are provided. These adjustments are used to center the cone precisely on the spindle. The procedure is first to move the source and observation unit up close to the cone. As the spindle is rotated, the return image in general appears to trace out a circular path. The cone is then adjusted laterally until the image remains stationary while the spindle is rotated. The next step is to move the observation unit to the far end of the lathe bed as shown in Fig. 35. The image will probably again trace out a circular path as the spindle is rotated. This is because the cone is in general tipped slightly with respect to the spindle. The cone is then adjusted to remove this tilt and if necessary, the steps are repeated to be sure that adjustment of the tilting has not affected the transverse adjustment of the cone.

Having made these two preliminary adjustments, it is now possible to test the alignment of the lathe head with respect to the bed or ways 150. The straightness of the bed is checked by observing the position of the return image at different points of the bed. It should be noted that any displacements or errors are observed as double because both the pinhole source and the pinhole reticle move together.

*Axicon autocollimators*

Figs. 36 and 37 illustrate simple forms of axiconic autocollimators. In the case of an autocollimator the source, the axicon, and the reticle all remain fixed relative to one another and the instrument is used to check the orthogonality of a plane mirror with respect to the projected axis. As is the case with most autocollimators, a separate light source may be used instead of the one in the unit itself, in which case the unit acts simply as an axiconic telescope. In Fig. 36 light from a point source 191 passes through an axicon 190 and forms a beam of light corresponding to the collimated beam in a spherical lens autocollimator. Actually the light from an axicon is never collimated in the same sense as the light from a collimating lens. The image of the source 191 is not "at infinity" but is at a whole range of points along the axis including infinity. Perhaps this light beam could be referred to as "axiconically collimating" and certain rays therein actually are parallel such as shown by the rays 192. This light is reflected by a test mirror 193 mounted on some object to be tested but not shown in this particular figure. The returning beam is axiconically focused by the axicon 190 and reflected by a semi-transparent surface 194 onto crosshairs 195 mounted in the field of a low power microscope consisting of an objective 196 and an eyepiece 197. In order to use this instrument as a simple axiconic telescope, the lamp 191 is turned off and an auxiliary lamp 199 is provided to illuminate a pinhole 198 in the test mirror 193. This arrangement permits the alignment of the pinhole 198 to be first checked and then by turning on the lamp 191, the orthogonality of the mirror 193 is then checked. For example, this autocollimator can be used in testing the alignment of a series of bearings for a shaft. A suitable plug carries the mirror 193 with its pinhole 198 and this plug is placed in turn in each bearing so that the lateral position thereof is first checked and also its angular alignment is determined by the beam reflected by the mirror 193.

Axiconic autocollimators are, of course, different from ordinary autocollimators in a number of ways. Their optical efficiency can be increased since there is no need to hold the light source in any critical focal plane. As shown in Fig. 37 the semi-transparent reflector of the instrument shown in Fig. 36 is replaced by a full reflector 201 having a tiny pinhole 202 in the center thereof. The fact that this pinhole 202 is not optically in the same plane as the crosshairs 195 is of no consequence because of the universal focus of the axicon 190. The pinhole 202 is illuminated by a lamp 200 and produces a light beam which again may be referred to as "axiconically collimated" and the returning rays 203 form an axiconic image on the retical plane 195. It may be noted that the outgoing and returning rays are not coincident or even parallel with each other.

Fig. 38 illustrates an axiconic instrument which in general is used as an axiconic telescope but which may be used also as an axiconic autocollimator. In a housing 210 there is mounted a cone 211 with the apex facing the rear. The cone angle is 18°. The projector system consists of a lamp 212 whose light is concentrated by a lens 213 on a pinhole 214 in a mirror 215 which is otherwise totally reflecting. The light from the pinhole 214 to the mirror 216, in the example shown, is at an angle of 7° 40 minutes to the axis of the axicon 211. The light reflected by the mirror 216 passes through a cone 217 which also has a cone angle of 18°. This light then passes through a semi-transparent surface 220 and is projected by the axicon 211. The telescope part of the instrument is actually two telescopes with a common objective, namely, the cone 211. The lower power telescope receives light reflected by the semi-transparent mirror 220 and a fully reflecting surface 221 and thence through an objective 222 which focuses or relays the axiconic image to crosshairs 223 which are observed through an eyepiece 224. Actually both this ocular 224 and ocular 231 may be interchangeable to give different powers.

The second telescope of the instrument consists of the axiconic objective 211 and an axiconic microscope made up of the cone 217 which receives light through the semi-transparent surface 220 and the ocular 231. The light from the cone 217 is reflected by the mirrors 216 and 215 onto crosshairs 230 mounted in the field of the ocular 231.

The arrangement shown in Fig. 38 has the cones 211 and 217 exactly balanced. As pointed out in connection with Fig. 27, it is sometimes desirable to have slightly more power in the microscope cone. The cone 211 is effectively but only slightly weaker if turned around as shown in Fig. 39. This is due to the fact that when the cone has turned over, it is acting more nearly at minimum deviation, thus there is less deviation through the objective cone 211 than through the second cone 217 so that images are seen out to great distances. A somewhat similar result is obtained as shown in Fig. 40 by adding a weak negative lens 235 in front of the usual cone 211. The lens 235 is carried in a suitable mount 236, much like a portrait attachment on a camera.

When the cones 211 and 217 exactly balance, the double cone system can be used as a telescope or as a projector but it cannot be used as an autocollimator. Merely turning the cone 211 around as in Fig. 39 is sufficient change to allow the double cone system to be used as an autocollimator. Alternatively a separate lamp 218 is used in Fig. 38 to illuminate a pinhole 219 arranged to transmit light through the reflecting surface 221 so that there is a single cone projector for the autocollimator in which case either telescope system may be used therewith even when the cones 211 and 217 exactly balance.

In some applications it may be desirable to change from the 1-to-1 magnification to a continuous range of lower magnifications. In general this is not true and in those cases where different magnifications are required, a series of different auxiliary lenses such as 235 may be used. However, if a continuous range is desired in order to set the magnification for the maximum distance required for each particular line-up job, a variable magnification axicon such as shown in Fig. 41 may be used. The cone 240 has a concave spherical rear surface. A plano convex lens 241 having the same curvature is adjustably mounted immediately behind the cone 240. The spacing between the two elements may be adjusted by sliding the mount 242 in the housing 210 by means of a button 243 extending through a slot 244 in the housing 210. If the positive lens 241 is moved away from the objective cone toward the microscope cone 217, the objective cone becomes weaker and the magnification of the system departs more and more from unity. In practice on each particular test job the observer sets the magnification once and for all so that the farthest point to be tested is just within the range of focus. This insures the maximum possible magnification and the brightest images over the range of the test.

Again it is emphasized that this whole instrument illustrated in Fig. 38 with or without the attachments is primarily used as an axiconic telescope with the lamps 212 and 218 turned off and with a separate point source some distance from the telescope.

The arrangement shown in Fig. 42 provides a simple method of measuring displacements with such an axicon telescope. Two plano parallel glass plates 251 and 253 are mounted in front of the cone 211. These plates are rotatable, one about a horizontal axis and the other about a vertical axis, by means of knobs 252 and 254 extending through the mount 250 of the attachment. This tipping of the plates about axes perpendicular to the axis of the telescope produces a displacement of the image in the telescope. Instead of having the attachment screwed onto the end of the telescope as shown in Fig. 42, the tilting plates may be carried in a separate mount 260 supported on a separate tripod 261 only part of which is shown in Fig. 43. When the plates are so mounted, the adjustment thereof cannot jar the alignment of the telescope in any way.

In general axicon telescopes are set up at some distance from the machine or plate to be tested. For example, a long bed of a planer may have its near point 10 feet from the telescope and its far point 40, 50, or perhaps 100 feet from the test instrument. The objective cone of the telescope sees distant objects through the marginal zone and uses the paraxial zone only for closeup objects. Hence in the example just chosen where there are no closeup objects nearer than 10 feet, the center of the cone is not used. Accordingly, this zone may be employed for some other purpose. In Fig. 44 the tip of the cone 265 has been rendered plano and an objective lens 267 of a telescope or viewfinder has been cemented thereto. Light through this lens 267 is reflected by a roof prism 268 to the ocular 269 of an auxiliary viewfinder.

Such a viewfinder is also directly applicable to axiconic telescopes in which toric axicons such as 270 in Fig. 45, are used. The plano central zone 271 of the axicon is normally rendered opaque, but the very center thereof, or for that matter any area of this central zone, may be used for a viewfinder, by mounting an objective 272 somewhere within the zone 271 of the toric.

It is sometimes desirable to establish a line through a hole that is smaller than the usual objective used in the aligner. Since the distant points are viewed by the larger zones of the axicon, it is not possible to view distant points through such a small hole. One way of overcoming this is to move the objective of the axicon telescope closer to the reticle so that the paraxial zones are used for more distant points. It is not convenient to do this with a full size cone, but since only the center is going to be used anyway, a smaller cone may be substituted for the main cone of the instrument. A simple arrangement for doing this is shown in Fig. 46 for which an auxiliary mount 276 carrying a smaller cone 275 is substituted for the main axicon 211 of the telescope.

The original problem which led to the discovery of the axicon principle and to optical aligners using axicons was the problem of aligning automatic boring machines which simultaneously bore from opposite sides of a work piece. The arrangement shown in Fig. 47 is a preferred one for testing the alignment of two tools or other machine elements which face each other. Essentially the instrument is similar to that shown in Fig. 35. A total reflector 280 having a pinhole 282 therein is illuminated from the rear by a lamp 281 so that the pinhole 282 acts as a point source. Light from this pinhole reaches a reflecting cone 283 which is mounted on the part of the machine to be tested, as discussed in connection with Fig. 35. The light is reflected by the cone 283 to form axicon images all along the axis including one at the reflector 280 itself. In this particular case it is not necessary to use separate crosshairs or other mark since the edges of the pinhole as seen from the axicon side (which is also the viewing side) act as the mark. The edges of the pinhole and the image of the pinhole are both viewed through a microscope whose objective is shown at 284. The reflector 280 is totally reflecting from both directions. Without moving the reflector 280, the lamp 281 is moved to the position 291 and the microscope is moved to the position 294. A second axiconic reflector 292 is mounted in the other machine part which is to be checked. Since the conical reflector system checks both position and tilt of the cone with respect to the pinhole source, since the same source and the same mark are used for both tests, and since the reflector 280 is not moved between the tests, a full check of the alignment of the two parts is obtained.

The most convenient form of two-direction reflector 280 is an evaporated metal layer between the hypothenuse faces of two right angle prisms forming a cube. However, such a cube would have to be lined up perfectly since a slight tilting thereof would by refraction cause a displacement of the reflecting beam in one direction in one case and in the other direction in the other case which would appear as a second-order error. To overcome this, plano convex elements 286 with the centers of curvature of their convex surfaces at the pinhole 282, are cemented to the entrance faces of the cubes. Thus the reflecting surface 282 effectively becomes a central plane of a sphere whose exit faces are flattened in Fig. 47 although a complete sphere could be used.

Fig. 48 shows a preferred embodiment of the invention similar to that shown in Figs. 38 to 46 inclusive. Where the parts are the same, similar numerals are used and the mountings for the individual elements of the optical system are not shown except for those associated with the oculars and the axicon objective with its attachments. In Fig. 48 a lamp 300 illuminates a pinhole in the mirror 215 directly. A variable magnification axicon is used. It consists of a cone 301 having a spherical concave rear surface and a convex plano element 302 behind the cone which is longitudinally adjustable by means of a button 303 sliding in a groove 304. The center 312 of the cone is flat and light therethrough is reflected by prisms 313 and 314 and is focused by a lens 311 onto a field lens 315. The image is relayed by a lens 316 to the focal plane of an auxiliary eye piece 317 adjacent to the other eyepieces. An auxiliary negative lens 310 is provided and tilting plates 320 and 322 rotatable by means of knobs 321 and 323 are also provided as attachments on this telescope. The tilting plates are not used when the instrument is employed as an autocollimator. The complete axicon aligner employing this telescope is shown in Fig. 49 in which the telescope is mounted on a support 330 which rests on the machine bed 331 which is to be tested. A light source 332 is carried in the chuck 333 which constitutes part of the machine tool under test.

Figs. 50 and 51 show axicon telescopes with simple but effective view finders which do not require any semi-reflecting surfaces or additional eye pieces but which do not interfere with the adjustment of the telescope itself. In Fig. 50 an objective cone 341 provides the axicon image by light through the marginal zone, but since the paraxial zone 342 is not used, it is polished plano. The axicon image is viewed by a microscope objective 343 which relays the image to a reticle 344 in the field of an eye piece 345. The whole unit is carried in a housing 340. Since the light through the central area 342 of the axicon is not used for forming an axicon image, it may be used for a view finder. Rotation of a knob 346 moves a relay objective 347 into the position 348 against an abutment 349.

The objective 343 now acts as a telescope objective and the image formed thereby is relayed by the auxiliary objective in the position 348 into the field of the eye piece 345. The auxiliary objective also serves to erect the image. The objective 343 is thus required to act as a telescope objective and therefore must be achromatic and well corrected at infinity conjugates. It happens that this does not impose a set of impossible conditions on the design of the objective 343. As pointed out previously, this objective does not need to be specially corrected when used as a microscope objective, i. e., when viewing the axicon image. Therefore, the objective 343 is designed as a telescope objective of relatively short focal length so that the view finder image is satisfactory. This same objective 343 is then quite satisfactory as a microscope objective working at 1 to 10 when viewing the axicon image, i. e., when the relay objective 347 is swung to one side of the optic axis.

The axicon image does not interfere with the viewfinder image and it is sometimes desirable to see both at once. However, when viewing the axicon image through the microscope and making precise settings therewith, the excess light may be cut off by turning a knob 351 to move an opaque mask 352 over the plano area 342.

A somewhat similar arrangement is shown in Fig. 51 for use with double cone telescope systems. In this case the axicon image formed by the marginal regions of the cone 341 is relayed by a second cone 355 to the reticle plane 344 for viewing through the eye piece 345. The cone 355 cannot be used in the viewfinder system and there is no convenient way of having a permanent plano area on the second cone 355 without interfering with the axiconic operation of the instrument. This difficulty is overcome as shown in Fig. 51 by moving an auxiliary negative cone 356 into the position shown by the broken lines 357 simply by rotation of a knob 358. The cone 356 is brought as close to the cone 355 as is possible without scratching the optical surfaces. The cone 356 does not have to be of the highest quality and may be molded from plastic.

A viewfinder objective 359 is cemented to the plano area 342 of the front cone 341 and is arranged to focus a viewfinder image somewhere near the complementary cones 355 and 357. Again this image is relayed by an auxiliary objective 347 when in the position indicated by broken lines 348.

In this arrangement the opaque mask 352 serves to cover the objective 359 whenever the axicon image is being viewed. A somewhat similar arrangement has the viewfinder objective cemented to the auxiliary cone 356, but this is less desirable since the relatively poor quality of the auxiliary cone 356 may then tend to interfere with the formation of the viewfinder image. However, such a system is useful when the cone 356 is made to have relatively high quality.

It should be particularly noted in both Figs. 50 and 51 that the temporary insertion of the view finder optics into the telescope does not involve any adjustment of the main axicon system. The front cone, the microscope objective either as a simple objective 343 or as a second cone 351, the reticle 344, and the eye piece 345 all remain in proper alignment independent of the setting of the view finder system.

The fact that axicons, as axicons, have no definite focal length should be obvious by now. The apparent exceptions to this rule occur in the following cases. The toric forms of axicons do not form a single point image of a point source but do form both axicon images and a real or virtual ring image in a plane. There is a tendency to associate the term focal length with this plane. However, this plane is not near the axicon image and, as far as the axicon effect is concerned, such torics still have no definite focal length. Another apparent, but not real, exception to the rule is found in molded fine element Fresnel lenses such as are commonly used for field lenses in camera finders or as projection screens. The Fresnel surfaces of these elements act exactly as a lens with a definite focal length and do not contribute to any axicon effect. However, the sides and edges of the elements and any recurring flaws act like concentric scratches to form axicon images. This axicon part of the element does not have a definite focal length and is different from the part of the element which does act as an ordinary lens.

I claim:

1. An optical aligner for measuring the straightness of an elongated object comprising a point source of light, a support for the source, an axicon aligned to receive light from said source and to form an axicon image over a range of points along the axis of the axicon, a support for the axicon, a fiducial mark within said range, ocular means for observing the image and mark, a support for the mark and ocular means, means for holding at least one of the three supports fixed relative to the object and means for moving at least one of the three supports precisely along the object.

2. An optical aligner according to claim 1 including means for holding the axicon, mark and ocular means fixed relative to the object and means for moving the point source of light precisely along the object.

3. An optical aligner according to claim 1 for measuring the precision of straight line movement of one machine part relative to another including means for holding the axicon, mark and ocular means fixed relative to said one machine part and means on said another part for carrying the point source of light approximately along the axis of the axicon during said straight line movement.

4. An optical aligner according to claim 1 including means for holding the point source and the axicon fixed relative to the object and means for supporting the mark and ocular means in precise relationship to the object at different points along the object.

5. An optical aligner according to claim 1 for measuring the precision of straight line movement of one machine part relative to another including means for holding the point source and the axicon fixed relative to said one machine part and means on said another part for carrying the mark and ocular means approximately along the axis of the axicon during said straight line movement.

6. An optical aligner according to claim 1 in which said ocular means is a microscope having an objective and an eyepiece.

7. An optical aligner according to claim 1 in which said ocular means includes a second axicon for receiving light from the first axicon image and for axiconically relaying said image and an eyepiece for viewing the relayed image, the refracting power of the second axicon approximately balancing that of the first, making each ray emerge from the second axicon approximately parallel to the direction in which it is incident on the first.

8. An optical aligner according to claim 1 including a weak positive lens adjacent to and aligned with said axicon for restricting the range of image points and for increasing the apparent brightness of the axicon images within the restricted range.

9. An optical aligner according to claim 1 in which the axicon is a reflecting axicon and the source and mark are located on the same side of the axicon.

10. An optical aligner according to claim 1 in which aligner the axicon is a reflecting axicon, held fixed relative to the object and means are included for supporting the point source, the mark and the ocular means in precise relationship to the object at different points along the object.

11. An optical aligner according to claim 1 for measuring the precision of straight line movement of one machine part relative to another in which aligner the axicon is a reflecting axicon held fixed relative to said one machine part and means are included on said another part for carrying the point source, the mark and the ocular means approximately along the axis of the axicon during said straight line movement.

12. An optical aligner according to claim 1 including a weak lens axially aligned with the axicon for changing said range.

13. An optical aligner according to claim 1 in which the axicon includes a spheroconcave conical element concave to the rear and a spheroconvex plano element immediately behind and convex toward the conical element and means for adjusting the axial separation of the two elements for changing said range.

14. An optical aligner according to claim 1 including at least one refracting plate optically aligned with the axicon and means for tilting the plate to shift the effective axis of the axicon.

15. An optical aligner according to claim 1 in which only the marginal zones of the axicon form the axicon image and in which a viewfinder is included comprising an objective lens on the axis of the axicon, a reflector for receiving light from the objective and for reflecting it to one side of the axicon beam and an eyepiece for receiving the reflected light and for viewing the image formed by the objective.

16. An autocollimator comprising a point source of light, an axicon aligned to receive light from said source and to project it axiconically to a reflecting surface under test and to receive the light reflected therefrom and to form an axicon image over a range of points along the axis of the axicon, reflector means being included optically between the axicon and the image to provide an image separate from the source, a fiducial mark within said range optically after the reflector means, ocular means for observing the image and mark, and means for supporting the source, the axicon, the reflector, the mark and the ocular means in a single unit.

17. An auto-collimator according to claim 16 in which the ocular means includes a microscope.

18. An auto-collimator according to claim 16 in which the ocular means includes a second axicon for receiving light from said image and for relaying it to form a second axicon image and an eyepiece for viewing said second image.

19. An auto-collimator according to claim 16 in which the point source of light is an axial pinhole in the reflector means illuminated from the rear.

20. An auto-collimator according to claim 16 in which the ocular means includes two microscopes of different powers and a beamsplitter positioned to receive light from the axicon and to distribute it to the two microscopes.

21. An auto-collimator according to claim 20 in which one of the microscopes is relatively wide angle low power and the other microscope has for its objective a second axicon whose refracting power approximately balances that of the first making each ray emerge from the second axicon approximately parallel to the direction in which it is incident on the first.

22. An optical aligner comprising a point source of light, an axicon aligned to receive light from said source and to form an axicon image over a range of points along the axis of the axicon, a fiducial mark within said range, ocular means for observing the image and mark and at least one additional point source of light spaced from the first-mentioned point source on the axis of the axicon and on the same side of the axicon, whereby the axicon forms axicon images of both sources, the light from the more distant source passing around the nearer source enroute to the axicon, said mark being within the ranges of both axicon images.

23. An optical aligner for checking alignment of two machine parts which face each other comprising a point source of light in the form of an illuminated pinhole in a light reflecting layer located on and oblique to the line of alignment to be checked, a reflecting axicon on one of the machine parts aligned to receive light from the pinhole, to form an axicon image of the pinhole over a range of points along the optic axis of the axicon and to reflect the light to the reflecting layer, the edges of the pinhole as seen from the axicon side forming a fiducial mark and ocular means for observing the image and mark.

24. An optical aligner according to claim 23 in which the reflecting layer is an interface between two right angle prisms whose outer surfaces on the line of alignment are spherical with the centre of curvature at the pinhole.

References Cited in the file of this patent

UNITED STATES PATENTS

| Number | Name | Date |
|---|---|---|
| 1,202,223 | Redfield | Oct. 24, 1916 |
| 1,501,979 | Willson | July 22, 1924 |
| 1,549,579 | Lenouvel | Aug. 11, 1925 |
| 1,981,999 | French | Nov. 27, 1934 |
| 2,059,033 | Rivier | Oct. 27, 1936 |
| 2,101,016 | Beach | Dec. 7, 1937 |
| 2,423,718 | Morrison | July 8, 1947 |
| 2,506,037 | Roelofs | May 2, 1950 |

OTHER REFERENCES

Machinery (Magazine), January 1945, pages 171–176, "Checking Aircraft Assembling Jigs By Optical-Mechanical Means,"